(12) United States Patent
Gallagher

(10) Patent No.: US 6,299,933 B1
(45) Date of Patent: Oct. 9, 2001

(54) CONTROL PROCESS FOR IMPREGNATING POROUS PARTS AND APPARATUS THEREFOR

(75) Inventor: Emerson Richard Gallagher, Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 09/619,324

(22) Filed: Jul. 19, 2000

(51) Int. Cl.[7] ........................................................ B05D 1/18
(52) U.S. Cl. .............................. 427/8; 427/294; 427/430.1
(58) Field of Search ................................ 427/8, 294, 430.1

(56) References Cited

U.S. PATENT DOCUMENTS

| 4,183,963 | 1/1980 | Brimelow et al. | 426/321 |
|---|---|---|---|
| 4,311,735 | 1/1982 | Young | 427/295 |
| 4,384,014 | 5/1983 | Young | 427/294 |
| 4,873,102 | 10/1989 | Chang et al. | 427/130 |
| 5,019,426 | * 5/1991 | Noe et al. | 427/314 |
| 5,348,774 | * 9/1994 | Golecki et al. | 427/543 |
| 5,776,372 | * 7/1998 | Saito et al. | 252/511 |
| 5,985,114 | * 11/1999 | Sekhar et al. | 204/290 R |
| 5,993,892 | * 11/1999 | Wasserman et al. | 427/8 |

* cited by examiner

Primary Examiner—Shrive P. Beck
Assistant Examiner—Michael Barr
(74) Attorney, Agent, or Firm—McAndrews, Held & Malloy, Ltd.

(57) ABSTRACT

A process for impregnating at least one porous part with an impregnant comprises: (a) immersing at least one porous part in a fixed volume of impregnant, (b) measuring at least one parameter indicative of the effective volume of the impregnant as the impregnant impregnates the porous part (s), and (c) interrupting impregnation when the measured parameter(s) indicates a desired level of impregnation is achieved. An apparatus for impregnating porous parts comprises a vessel for holding at least one porous part and a fixed volume of impregnant, and at least one device for measuring the change in effective volume of the impregnant within the vessel.

22 Claims, 2 Drawing Sheets

CONTROL PROCESS FOR IMPREGNATING POROUS PARTS AND APPARATUS THEREFOR

FIELD OF THE INVENTION

The present process and apparatus relate to controlling the extent of impregnation of porous parts during the impregnation thereof. In particular, the present process and apparatus provide for control of the extent of impregnation by measuring the change in effective volume of impregnant during the impregnation process.

BACKGROUND OF THE INVENTION

Impregnation of porous parts is a common technique employed in a variety of industries for a variety of reasons. Stone, brick, ceramic, wood, polymer, aggregate, cermet., and porous metal parts, for example, are commonly impregnated. Commonly, a sealant is impregnated into the part because the porosity is undesirable in the intended end use of the part. In some applications, it is only necessary to seal the pores on the surface of the part. In other applications, thorough impregnation of the part is necessary. Further, in certain applications, it may be possible to over-impregnate a part, so the level of impregnation should be carefully controlled.

For example, separator plates are a component of fuel cells, including solid polymer electrolyte fuel cells. Separator plates are electrically conductive and substantially impermeable to the fluid reactants and/or coolants used in the fuel cell or fuel cell stack. They are commonly made from graphitized carbon, carbon-resin composites, or graphite. The plates are typically impregnated with a resin that assists in imparting the necessary impermeability and mechanical stability. The plates should be thoroughly impregnated with resin.

Expanded graphite sheets, such as the material available from UCAR Carbon Technology Corp. (Danbury, Conn., U.S.A.) under the tradename GRAFOIL, may be used to form separator plates for fuel cells. Expanded graphite sheets are useful in this regard because they are relatively light, flexible and amenable to lowcost manufacturing methods, such as embossing. Separator plates made from expanded graphite sheet may be impregnated with a suitable resin in order to achieve the desired impermeability and mechanical stability discussed above. It is important that such plates be sufficiently impregnated to meet performance requirements. At the same time, it is possible to over-impregnate the plates, resulting in degradation or loss of desired structural and/or functional properties. Accordingly, impregnation process control is an important aspect of separator plate manufacture.

Conventional impregnation process control methods typically rely on a consistent time to sufficiently impregnate a part. Based on such methods, an optimum time can be selected to ensure adequate impregnation without much wasted time or expenditure. However, where relatively subtle process and/or material changes can drastically affect the proper impregnation time necessary to achieve the desired impregnation level, such methods are unsatisfactory. For example, the variability of different grades, lots and batches of expanded graphite sheet, as well as variations in separator plate processing or design, has made it virtually impossible to determine an appropriate impregnation time beforehand for a given lot of separator plates.

Current methods use the impregnation time from the previous batch of plates as the initial time estimate for impregnation of the next batch, taking into account other factors such as plate thickness and density. Since the level of impregnation can only be assessed after the impregnation process is complete, entire batches of parts may have to be scrapped due to incorrect estimates of the impregnation time. This approach is costly in terms of time and materials, and is poorly suited to high-volume production methods.

Accordingly, a method of controlling the impregnation of porous parts that allows the extent of impregnation to be predictably controlled is desirable.

The present process and apparatus address one or more of the problems associated with the prior art impregnation control processes. Specifically, the present process and apparatus allow the extent of impregnation of a porous part to be controlled during the impregnation process.

SUMMARY OF THE INVENTION

A process for impregnating at least one porous part with an impregnant is provided comprising:
(a) immersing at least one porous part in a fixed volume of impregnant;
(b) measuring at least one parameter indicative of the effective volume of impregnant as it impregnates the at least one porous part; and
(c) interrupting impregnation when the at least one measured parameter indicates a desired level of impregnation is achieved.

The at least one measured parameter may comprise the change in effective volume of the impregnant, the rate of change in effective volume of the impregnant, or both. Preferably, the measured parameter is measured continuously. Impregnation may be interrupted when the change in effective volume exceeds a predetermined threshold value and/or when the rate of change in effective volume falls below a predetermined threshold value. The measured parameter may be compared to a reference parameter value and impregnation interrupted when the measured parameter varies from the reference parameter value by less than a predetermined threshold amount. For example, impregnation may be interrupted when the measured parameter indicates that at least 85% of the void volume of the porous part(s) is impregnated, or alternatively, when the measured parameter indicates that at least 95% of the void volume of the porous part(s) is impregnated.

The process may further comprise sending an output signal representative of the at least one measured parameter to a controller. The controller may comprise a display for displaying the at least one measured parameter represented by the output signal and impregnation may be interrupted in response to an output signal from the controller.

The porous part(s) may comprise carbon plates, for example. The carbon plates may be graphite plates, and more specifically, may be expanded graphite plates. The impregnant may comprise a resin, such as a resin selected from the group consisting of phenols, epoxies, melamines, furans and methacrylates.

The porous part(s) may be impregnated at any suitable pressure. For example, the porous part(s) may be impregnated at ambient pressure, at a pressure less than atmospheric pressure, at a pressure greater than atmospheric pressure, or any combination thereof.

An apparatus for impregnating porous parts is also provided, comprising a vessel for holding at least one porous part and a fixed volume of impregnant, and at least one device for measuring the change in effective volume of the impregnant within the vessel. The measuring device may be a series of graduations on a wall of the vessel or a depth gauge, for example. The measuring device may also comprise a level sensor such as linear hall effect sensors, linear encoders, linear variable displacement transducers, and digital probes, for example. The measuring device may also comprise a pressure transducer associated with the interior of the vessel.

The apparatus may further comprise a pump fluidly connected to the vessel for reducing the pressure therein below atmospheric pressure, or for increasing the pressure therein above atmospheric pressure, or both.

The measuring device preferably generates output signals representative of the measured change in effective volume, the measured rate of change in effective volume, or both. The apparatus may further comprise a controller for receiving output signals from at least one measuring device and for displaying the change in effective volume represented by the signals.

DETAILED DESCRIPTION OF PREFERRED EMBODIMENTS

The present process and apparatus allow for control of the level of impregnation of porous parts by measuring the change in volume of the impregnant during the impregnation process. The present process and apparatus may be applicable to the impregnation of any porous parts by an impregnant. Such porous parts may include, for example, stone, brick, ceramic, wood, polymer, aggregate, cermet, and porous metal parts, as well as parts comprising porous carbon. Any suitable liquid impregnant may also be used, depending upon the application. The present process and apparatus are particularly applicable to impregnation of porous parts where batch-to-batch variability makes impregnation processes based on a constant, predictable impregnation time unsuitable, or where a target level of impregnation is desired for performance or cost effectiveness.

Porous parts comprise solids of a known density and empty voids. When dry porous parts are immersed in a vessel containing a fixed volume of liquid impregnant, they displace the impregnant by a determinable amount to give an effective volume of impregnant. The "effective volume" of impregnant is equal to the volume of impregnant in the vessel, the solid volume of the porous part(s), and the void volume thereof not filled with impregnant. As the voids are filled with impregnant, the effective volume of the impregnant decreases. By measuring the magnitude of this change in volume, it is generally to determine the level of impregnation of the part. Alternatively or additionally, the rate of change in volume of the impregnant may be measured to determine the level of impregnation of the part. When the change in effective volume and/or the rate of change in effective volume indicates the desired level of impregnation has been achieved, the part may be removed from the impregnant, or the impregnation process may be otherwise interrupted.

Figure 1:
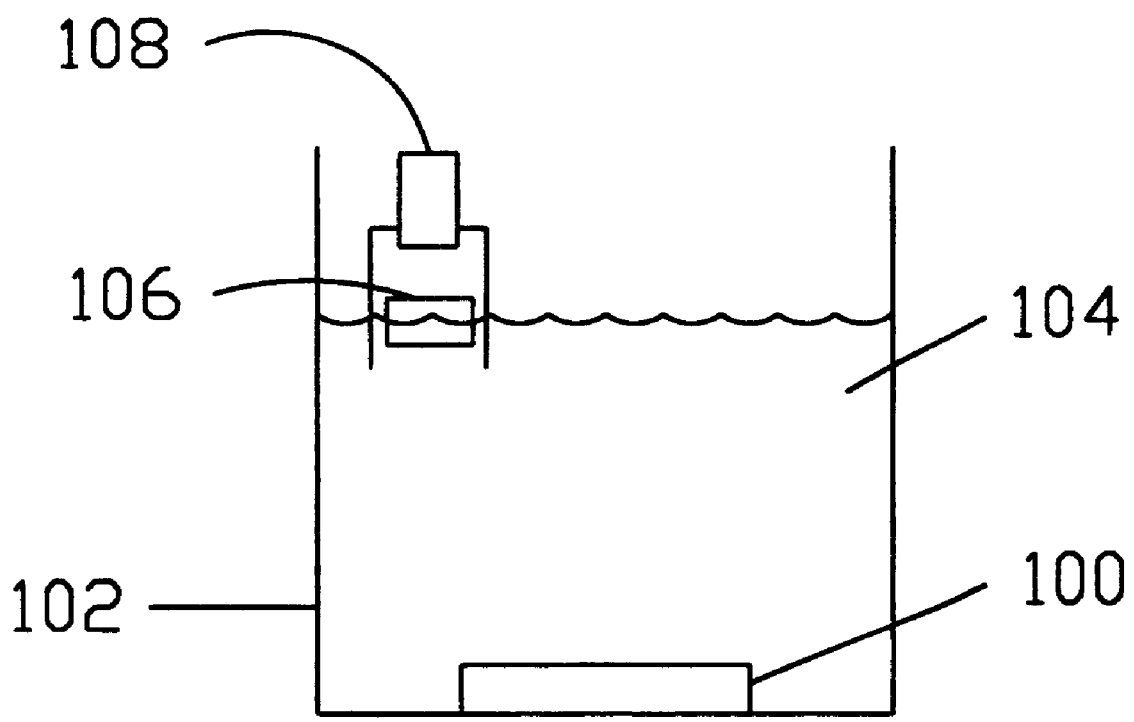
FIG. 1 is a schematic illustration of an embodiment of the present apparatus.

FIG. 1 is a schematic illustration of an embodiment of the present apparatus. Porous part 100 rests in vessel 102 filled with a fixed volume of liquid impregnant 104. Floating magnet 106 floats on the surface of impregnant 104 and is positioned within range of linear hall effect sensor 108. As part 100 is immersed in impregnant 104, sensor 108 measures the level of impregnant in vessel 102. As impregnant fills the voids in part 100, sensor 108 measures the change in effective volume of impregnant indicated by the corresponding change in impregnant level in vessel 102. The change in effective volume of impregnant 104, the rate of change thereof, or both, may be measured and used to determine when the desired level of impregnation is achieved.

Figure 2:
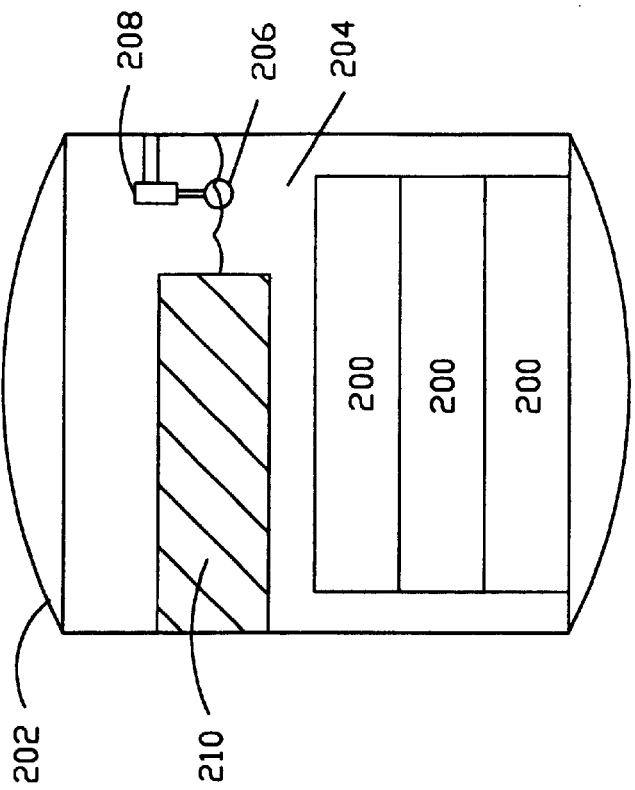
FIGS. 2 and 3 are schematic illustrations of a preferred embodiment of the present apparatus.
Figure 3:
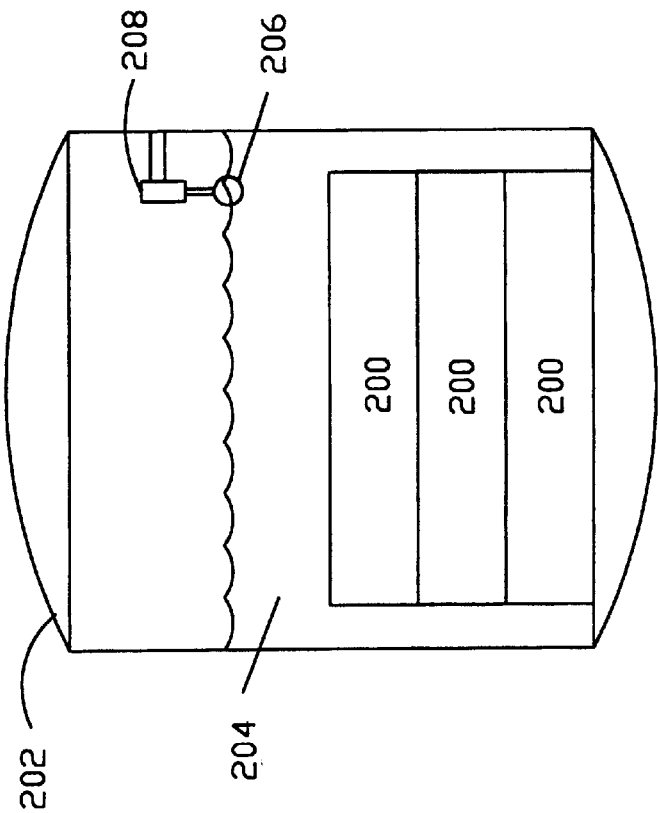

FIGS. 2 and 3 are schematic illustrations of a preferred embodiment of the present apparatus. Porous parts 200 rest in vessel 202 containing a fixed volume of impregnant 204. Float 206 is connected to linear encoder 208, which is attached to the inner surface of vessel 202. Float 206 floats on the surface of the impregnant, permitting linear encoder 208 to measure changes in the level of impregnant in vessel 202. In a preferred embodiment of the present method, porous parts 200 are immersed in impregnant 206 and linear encoder 208 measures the initial level of impregnant in vessel 202. As impregnant fills the voids in parts 200, linear encoder 208 measures the change in effective volume of impregnant indicated by the corresponding change in impregnant level in vessel 202. The change in effective volume of impregnant 204, the rate of change thereof, or both, may be measured and used to determine when the desired level of impregnation is achieved. In addition, the apparatus illustrated in FIG. 3 further comprises removable block 210. Block 210 may be immersed in the impregnant as shown, and may be of any suitable size, shape and composition. Block 210 effectively reduces the size of vessel 202 adjacent to linear encoder and amplifies the change in level of impregnant as it fills the voids in parts 200. Thus, block 210 may increase the sensitivity of linear encoder 208 to volume changes and may permit finer control over the impregnation process.

The desired level of impregnation of the porous parts may depend on the application. For example, where the porous parts are expanded graphite fuel cell plates, preferably at least 85% of the void volume should be filled with impregnant, more preferably at least 95%. The amount of variation from the desired level of impregnation may vary with the particular application, and may depend on the specification tolerance of the impregnated product. For example, the desired level of impregnation for expanded graphite fuel cell plates may be 90%, within ±5%.

Porous parts of a known volume and density will have voids of a given total volume. By calculating the volume of impregnant in the part(s), based on the change in effective volume of the impregnant, it is possible to calculate the percentage of void volume of the part that is filled. Alternatively, the change in effective volume of impregnant over time can be plotted. The slope of the resulting curve at a given time may be indicative of the proportion of total void volume filled with impregnant. As a further alternative, both the change and rate of change in effective volume may be monitored. For example, in situations where batch-to-batch variability is a concern, the rate of change if effective volume may be plotted with test samples of a given batch and the resulting graph may be used to determine the change in effective volume corresponding to a desired level of impregnation.

The impregnation can be performed at atmospheric pressure, if desired, or at a lower or higher pressure. For example, it may be desirable to impregnate the part(s) under reduced pressure in order to remove air entrained in the impregnant. Alternatively, it may be desirable to impregnate at super-atmospheric pressure in order to force the impregnant into the pores of the part(s) being impregnated. As a further example, impregnation may be initiated at a reduced pressure to remove excess air, and then the pressure may be increased to super-atmospheric pressure in order to assist penetration of the impregnant into the porous part(s).

Any liquid impregnant may be used in the present process and apparatus. The choice of impregnant will be determined by such factors as compatibility with the porous part and desired characteristics of the impregnant and of the final product. Suitable impregnants for expanded graphite fuel cell plates, for example, are preferably stable, curable and capable of substantially filling the voids in the plate. Known resins suitable for such purposes include phenols, epoxies, melamines, furans, and methacrylates. The choice of impregnant is not essential to the present process and apparatus, and the appropriate impregnant for a given application may be determined by those skilled in the art.

Any suitable device for measuring the change in volume of the impregnant may be used in the present process and apparatus. For example, the interior of the vessel may have a series of graduations that may be used to measure the change in impregnant level during the impregnation process, or similarly, a depth gauge may be lowered into the vessel during impregnation to measure the change in impregnant level. Sensors that can detect changes in impregnant level in the vessel may be used, such as linear hall effect sensors, linear encoders, linear variable displacement transducers, or digital probes, for example. Other suitable level/displacement measuring devices will be recognized by those skilled in the art.

In addition, a pressure sensor may be used to indirectly measure the change in effective volume of impregnant in the present process and apparatus. The pressure at the bottom of the impregnation vessel depends on the density of the impregnant, the height of the impregnant column, and the atmospheric pressure over the surface of the impregnant. During impregnation, the height of the impregnant column decreases as the effective volume decreases. By placing one or more pressure sensors at or near the bottom of the impregnation vessel, it may be possible to measure the change in effective volume indirectly by measuring the change in pressure exerted on the sensors. Suitable such sensors include pressure transducers, for example.

Preferably, the device for measuring the change in volume of the impregnant generates an output signal representative of the measured change in volume during impregnation. The present apparatus may further comprise a controller for receiving the output signals from the device. The controller may also display the measured change and/or rate of change in volume. The controller could be programmed to interrupt the impregnation process in response to the measured parameter(s). For example, the controller could interrupt impregnation when the change in volume of the impregnant exceeds a predetermined threshold value, or differs from a threshold value by a predetermined amount. Alternatively, the controller could interrupt the process when the rate of change in volume of the impregnant falls below a given threshold amount. As a further example, the controller may interrupt the process when either of the foregoing conditions is met.

While particular elements, embodiments and applications of the present invention have been shown and described, it will be understood, of course, that the invention is not limited thereto since modifications may be made by those skilled in the art, particularly in light of the foregoing teachings. It is therefore contemplated that the appended claims cover such modifications that incorporate those features coming within the scope of the invention.

What is claimed is:

1. A process for impregnating at least one porous part with an impregnant, said process comprising:

(a) immersing said at least one porous part in a fixed volume of said impregnant;

(b) measuring at least one parameter indicative of the effective volume of said impregnant as said impregnant impregnates said at least one porous part, wherein said measured parameter comprises at least one of the change in effective volume of said impregnant and the rate of change in effective volume of said impregnant; and (c) interrupting impregnation when said at least one measured parameter indicates a desired level of impregnation is achieved.

2. The process of claim 1 wherein said at least one measured parameter comprises the change in effective volume of said impregnant.

3. The process of claim 2 wherein in step (c), impregnation is interrupted when said change in effective volume exceeds a predetermined threshold value.

4. The process of claim 1 wherein said at least one measured parameter comprises the rate of change in effective volume of said impregnant.

5. The process of claim 4 wherein in step (c), impregnation is interrupted when said rate of change in effective volume falls below a predetermined threshold value.

6. The process of claim 1 wherein said at least one measured parameter comprises the change in effective volume of said impregnant and the rate of change in effective volume of said impregnant.

7. The process of claim 6 wherein in step (c), impregnation is interrupted when said change in effective volume exceeds a predetermined threshold value.

8. The process of claim 6 wherein in step (c), impregnation is interrupted when said rate of change in effective volume falls below a predetermined threshold value.

9. The process of claim 1 wherein step (b) further comprises comparing said measured parameter to a reference parameter value.

10. The process of claim 9 wherein said impregnation is interrupted when said measured parameter varies from said reference parameter value by less than a predetermined threshold amount.

11. The process of claim 1 wherein said at least one measured parameter is measured continuously.

12. The process of claim 1 further comprising sending an output signal representative of said at least one measured parameter to a controller.

13. The process of claim 12 wherein said controller comprises a display for displaying said at least one measured parameter represented by said output signal.

14. The process of claim 13 wherein said impregnation is interrupted in response to an output signal from said controller.

15. The process of claim 1 wherein said at least one porous part comprises a carbon plate.

16. The process of claim 15 wherein said carbon plate is a graphite plate.

17. The process of claim 16 wherein said graphite plate is an expanded graphite plate.

18. The process of claim 17 wherein said impregnant comprises a resin, and said resin is selected from the group consisting of phenols, epoxies, melamines, furans and methacrylates.

19. The process of claim 1 wherein said at least one porous part is impregnated at a pressure less than atmospheric pressure.

20. The process of claim 1 wherein said at least one porous part is impregnated at a pressure greater than atmospheric pressure.

21. The process of claim 1 wherein said impregnation is interrupted when said measured parameter indicates that at least 85% of the void volume of said at least one part is impregnated.

22. The process of claim 1 wherein said impregnation is interrupted when said measured parameter indicates that at least 95% of the void volume of said at least one part is impregnated.

* * * * *